US009733335B2

(12) United States Patent
Connolly et al.

(10) Patent No.: US 9,733,335 B2
(45) Date of Patent: Aug. 15, 2017

(54) RFID TAG LOCATIONING USING DYNAMIC BEACON TAG ASSOCIATION

(71) Applicant: SYMBOL TECHNOLOGIES, INC., Lincolnshire, IL (US)

(72) Inventors: Sean A Connolly, Stonybrook, NY (US); Thomas E Wulff, No Patchogue, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 51 days.

(21) Appl. No.: 14/540,070

(22) Filed: Nov. 13, 2014

(65) Prior Publication Data

US 2016/0139237 A1    May 19, 2016

(51) Int. Cl.
G06Q 10/00      (2012.01)
G06K 9/00       (2006.01)
(Continued)

(52) U.S. Cl.
CPC .............. *G01S 5/02* (2013.01); *G01S 5/0284* (2013.01); *G01S 13/751* (2013.01); *G01S 13/82* (2013.01); *G06K 7/10009* (2013.01); *G06K 9/00362* (2013.01); *G06Q 50/28* (2013.01); *G01S 3/14* (2013.01); *G01S 5/04* (2013.01);
(Continued)

(58) Field of Classification Search
CPC .... G01S 13/878; G01S 13/003; G01S 13/426; G01S 13/723; G01S 7/412; G01S 13/75; G01S 13/04; G01S 13/765; G01S 13/84; G01S 1/68; G01S 5/14; G01S 13/74; G01S 13/751; G01S 13/785; G01S 2013/09; G01S 5/0027; G01S 5/0036; G01S 5/009; G01S 5/0252; G01S 5/0273; G01S 5/0284; G01S 5/10; G01S 13/08; G01S 13/82; G01S 3/14; G01S 5/02; G01S 5/04; G01S 5/06;
(Continued)

(56) References Cited

U.S. PATENT DOCUMENTS 8,294,554 B2    10/2012  Shoarinejad et al.
2004/0069852 A1  4/2004  Seppinen et al.
(Continued)

FOREIGN PATENT DOCUMENTS

EP    1239634 B1    2/2010

OTHER PUBLICATIONS

Rung-Ching Chen et al: :A Novel Method for Indoor Location Identification, International Symposium On, IEEE, Nov. 1, 2010.
(Continued)

*Primary Examiner* — Dionne H Pendleton
(74) *Attorney, Agent, or Firm* — Yuri Astvatsaturov

(57) ABSTRACT

A method and apparatus for determining the position of a RFID tag. The method includes the following: (1) measuring the position of an active device to an accuracy of better than 1.0 meter using a radio locating system to determine the position of a reference point; (2) detecting a first RF signal from a reference RFID tag near the reference point with an RF receiver in an RFID reading system; (3) detecting a second RF signal from a RFID tag of interest with the RF receiver in the RFID reading system; and (4) processing both the first RF signal and the second RF signal and relying upon at least partially the position of the reference point to determine the position of the RFID tag of interest.

36 Claims, 9 Drawing Sheets

(51) Int. Cl.
*G01S 5/02* (2010.01)
*G06Q 50/28* (2012.01)
*G01S 13/82* (2006.01)
*G01S 13/75* (2006.01)
*G06K 7/10* (2006.01)
*G01S 3/14* (2006.01)
*G01S 5/04* (2006.01)
*G01S 5/06* (2006.01)

(52) U.S. Cl.
CPC ............ *G01S 5/06* (2013.01); *G07C 2209/63* (2013.01); *G07C 2209/64* (2013.01)

(58) Field of Classification Search
CPC .... G07C 5/0808; G07C 5/085; G01C 21/206; G06K 7/10009
See application file for complete search history.

(56) References Cited

U.S. PATENT DOCUMENTS

| | | | |
|---|---|---|---|
| 2006/0290496 A1* | 12/2006 | Peeters | A61B 5/0002 340/572.1 |
| 2007/0073513 A1* | 3/2007 | Posamentier | G01S 13/751 702/150 |
| 2010/0201520 A1* | 8/2010 | Stern | G01S 13/878 340/572.1 |
| 2012/0127976 A1 | 5/2012 | Lin et al. | |
| 2013/0088334 A1 | 4/2013 | Chen et al. | |
| 2013/0251003 A1 | 9/2013 | Lakkis et al. | |
| 2014/0152507 A1* | 6/2014 | McAllister | H01Q 11/08 342/126 |
| 2014/0205155 A1* | 7/2014 | Chung | G06K 9/00362 382/115 |
| 2015/0185023 A1* | 7/2015 | Pittman | G01C 21/206 701/494 |
| 2015/0362581 A1* | 12/2015 | Friedman | G01S 13/767 455/456.1 |
| 2016/0033635 A1* | 2/2016 | Hansen | G01S 13/75 342/451 |

OTHER PUBLICATIONS

Xie Yinggang et al.: Indoor Location Technology and Its Applications Base on Improved Landmarc Algorithm, control and Decision Conference (CCDC), May 23, 2011.

International Search Report and Written Opinion mailed Jan. 19, 2016 in counterpart PCT application PCT/US2015/055097.

* cited by examiner

RFID TAG LOCATIONING USING DYNAMIC BEACON TAG ASSOCIATION

BACKGROUND OF THE INVENTION

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Since the reader "interrogates" RFID tags, and receives signals back from the tags in response to the interrogation, the reader is sometimes termed as "reader interrogator" or simply "interrogator".

In a RFID system, typically a reader transmits a continuous wave (CW) or modulated radio frequency (RF) signal to a tag. The tag receives the signal, and responds by modulating the signal, "backscattering" an information signal to the reader. The reader receives signals back from the tag, and the signals are demodulated, decoded and further processed. In many applications of RFID technology, it is desirable to find the physical location of one or more RFID tags accurately.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
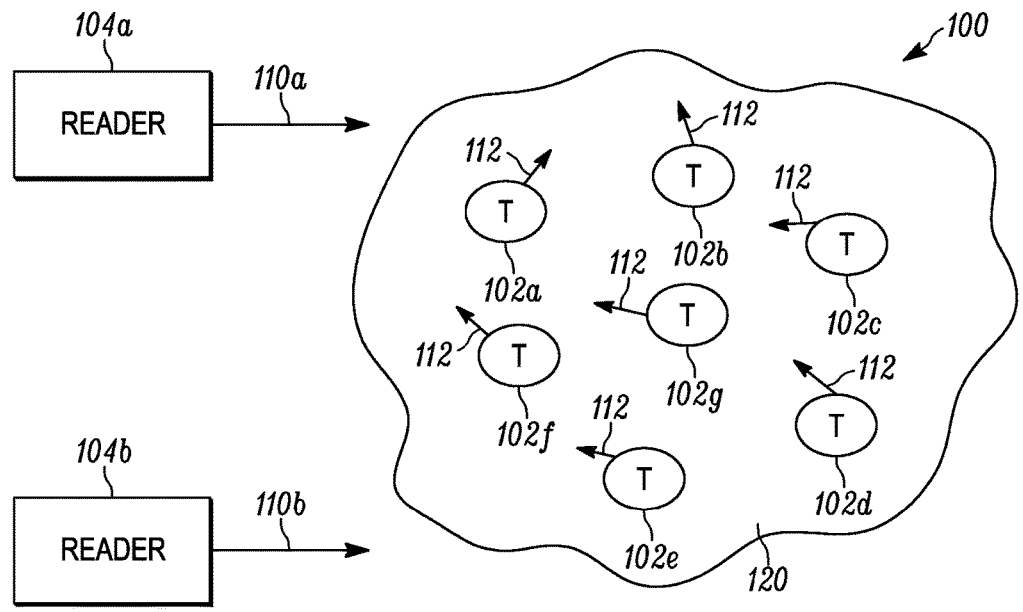
FIG. 1 illustrates an environment where RFID tag readers communicate with an exemplary population of RFID tags in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method includes the following: (1) measuring the position of an active device to an accuracy of better than 1.0 meter using a radio locating system to determine the position of a reference point; (2) detecting a first RF signal from a reference RFID tag near the reference point with an RF receiver in an RFID reading system; (3) detecting a second RF signal from a RFID tag of interest with the RF receiver in the RFID reading system; and (4) processing both the first RF signal and the second RF signal and relying upon at least partially the position of the reference point to determine the position of the RFID tag of interest.

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110 having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 860-960 MHz, including 902-928 MHz, and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred, to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
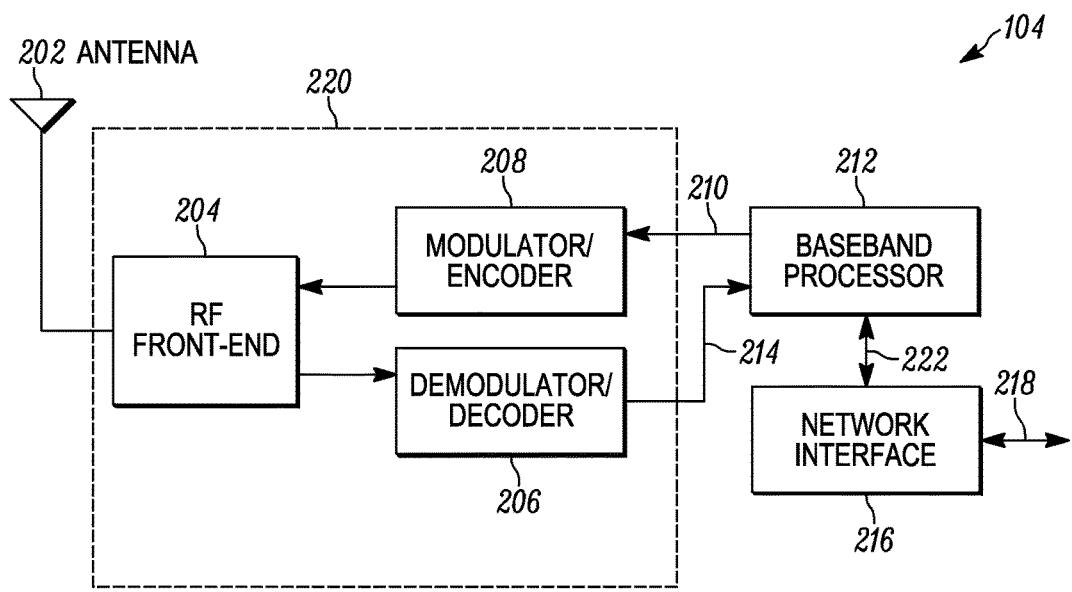
FIG. 2 shows a block diagram of an example RFID reader in accordance with some embodiments.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type. Some examples of antenna suitable for reader 104 are described in U.S. Pat. No. 7,551,140, filed Nov. 3, 2005, titled "Low Return Loss Rugged RFID Antenna."

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FMO or Miller encoding formats in an EPC Gen 2 embodiment. Demodulator/decoder 206 outputs decoded data signal 214. Note that in an embodiment, baseband processor 212 may alternatively perform the decoding function of demodulator/decoder 206.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
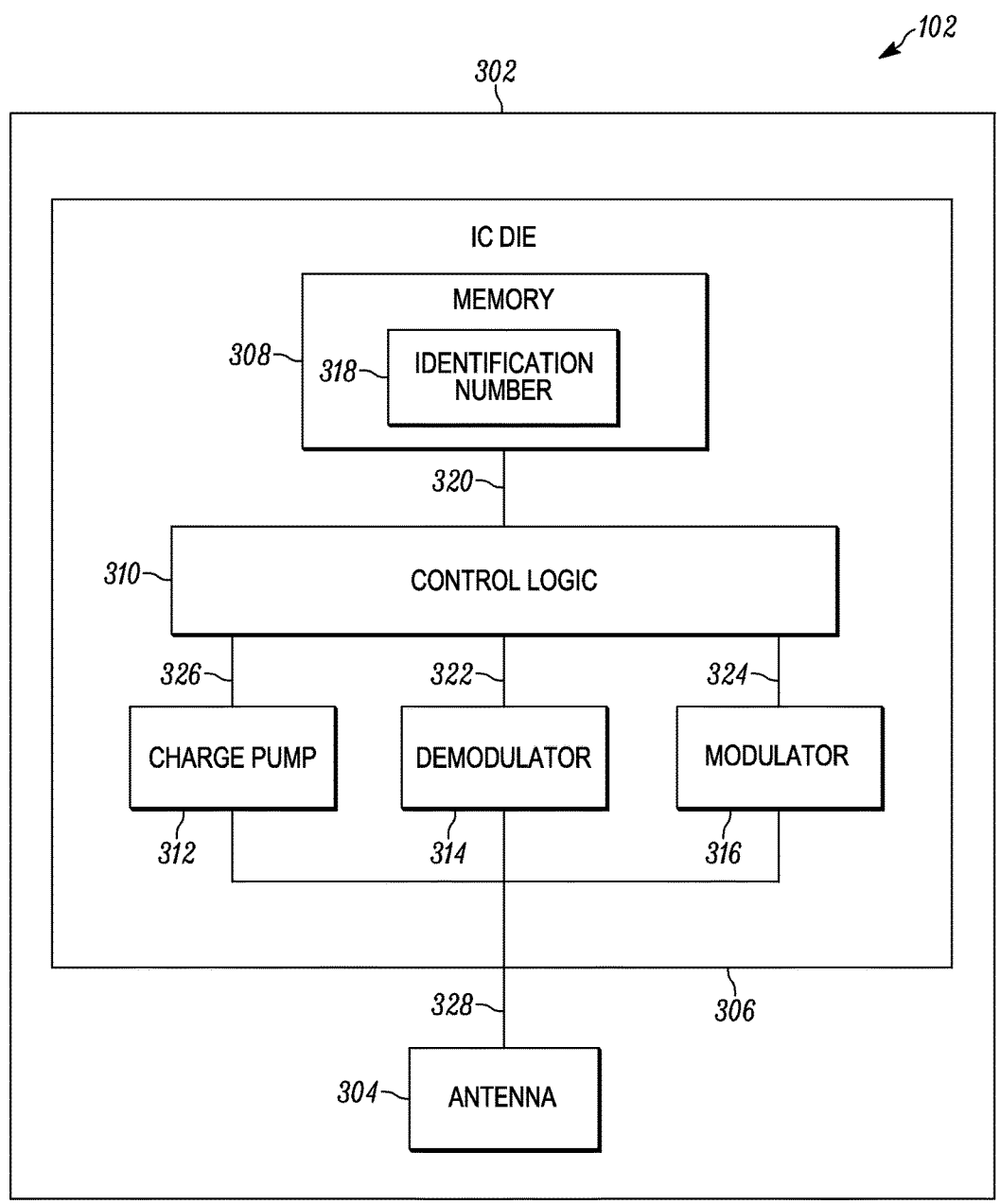
FIG. 3 is a schematic of an example RFID in accordance with some embodiments.

The present invention is applicable to any type of RFID tag, including passive tags and active tags, and semiconductor based tags and surface acoustic wave (SAW) tags. For illustrative purposes, FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302.

IC 306 is attached to substrate 302, and is coupled to antenna 304. IC 306 may be attached to substrate 302 in a recessed and/or non-recessed location. IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328.

Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 controls the operation of RFID tag 102, based on internal logic, the information received from demodulator 314, and the contents of memory 308. Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. Modulator 316 and demodulator 314 may be referred to collectively as a "transceiver" of tag 102.

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags. Example embodiments of the invention described in this disclosure may be implemented in the environments and readers described above, and/or in alternative environments and alternative RFID devices.

Figure 4:
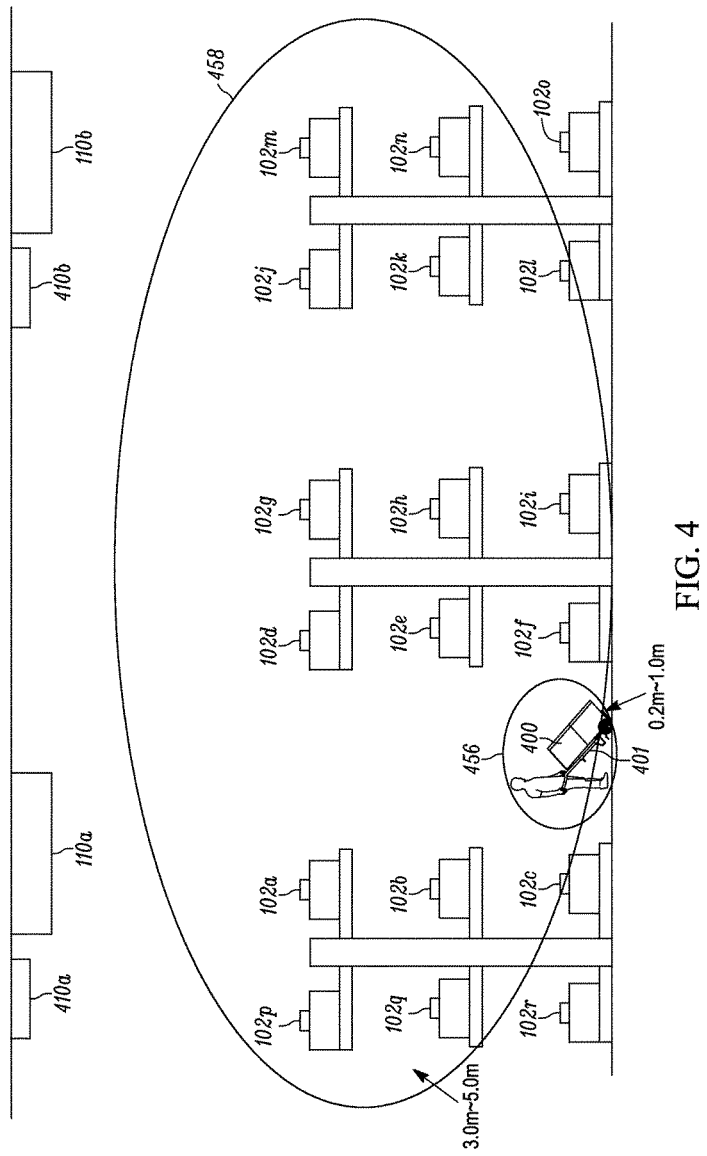
FIG. 4 is a schematic of a warehouse arrangement that has one or more RFID readers for reading RFID tags associated with the target objects in accordance with some embodiments.

FIG. 4 is a schematic of a warehouse arrangement that has one or more RFID readers for reading RFID tags associated with the target objects in accordance with some embodiments. In FIG. 4, each of the RFID tags (102a, 102b, 102c, . . . , 102q, and 102r) is associated with a target object. Each of the readers 110a and 110b can be used to read at least some of the RFID tags in the warehouse. In FIG. 4, a reader (e.g., 110a or 110b) can be used to read the RFID tags within a certain volume space as defined by boundary 458. When a specific RFID tag is read by the reader, the physical location of this specific RFID tag can be determined with the accuracy of 3.0 to 5.0 meters.

As shown in FIG. 4, in the warehouse, an active device 400 (e.g., a smart badge, a smart watch, a smartphone, or a tablet computer) is placed on a moving object 480, and a radio locating system locating is configured to find the physical location of the active device 400. In the specific implementation as shown in FIG. 4, the radio locating system includes radio locating devices 410a and 410b distributed at different physical locations. In FIG. 4, the radio locating system can determine that the active device 400 is located within a volume space as defined by boundary 456, and it can find the physical location of the active device 400 with the accuracy of better than 1.0 meter (e.g., with the accuracy of 0.2 to 1.0 meters). In this disclosure, the measurement on the physical location of the active device 400 is used to improve the measurement accuracy of the physical location of one or more RFID tags in the vicinity of the active device 400.

Figure 5:
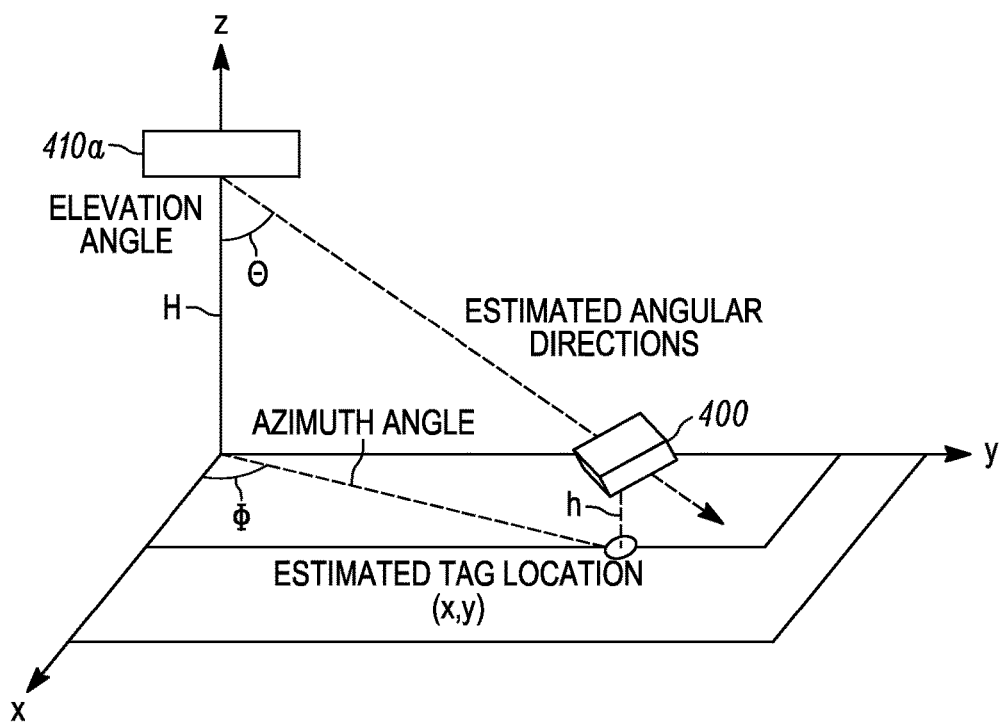
FIG. 5 depicts an embodiment of a radio locating system that includes a radio locating device configured to determine the physical location of an active device.
Figure 7A:
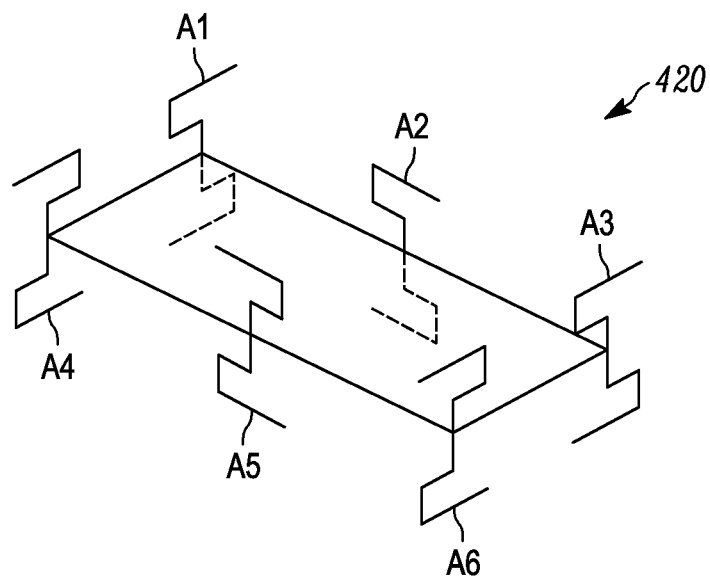
FIG. 7A and FIG. 7B are schematics of the array of antennas for using in the radio locating device in accordance with some embodiments.
Figure 7B:
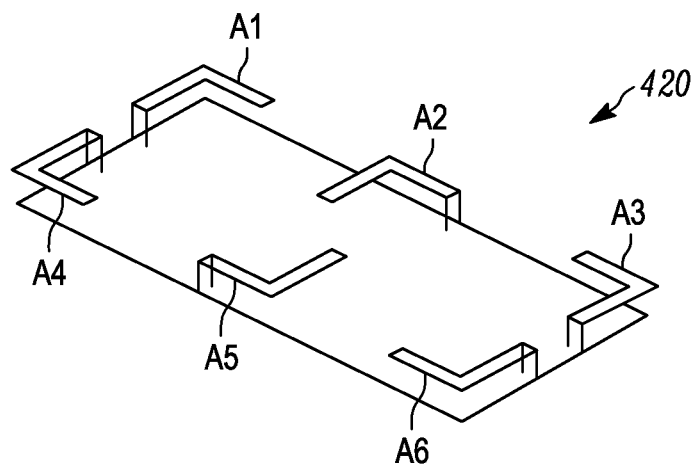
Figure 8:
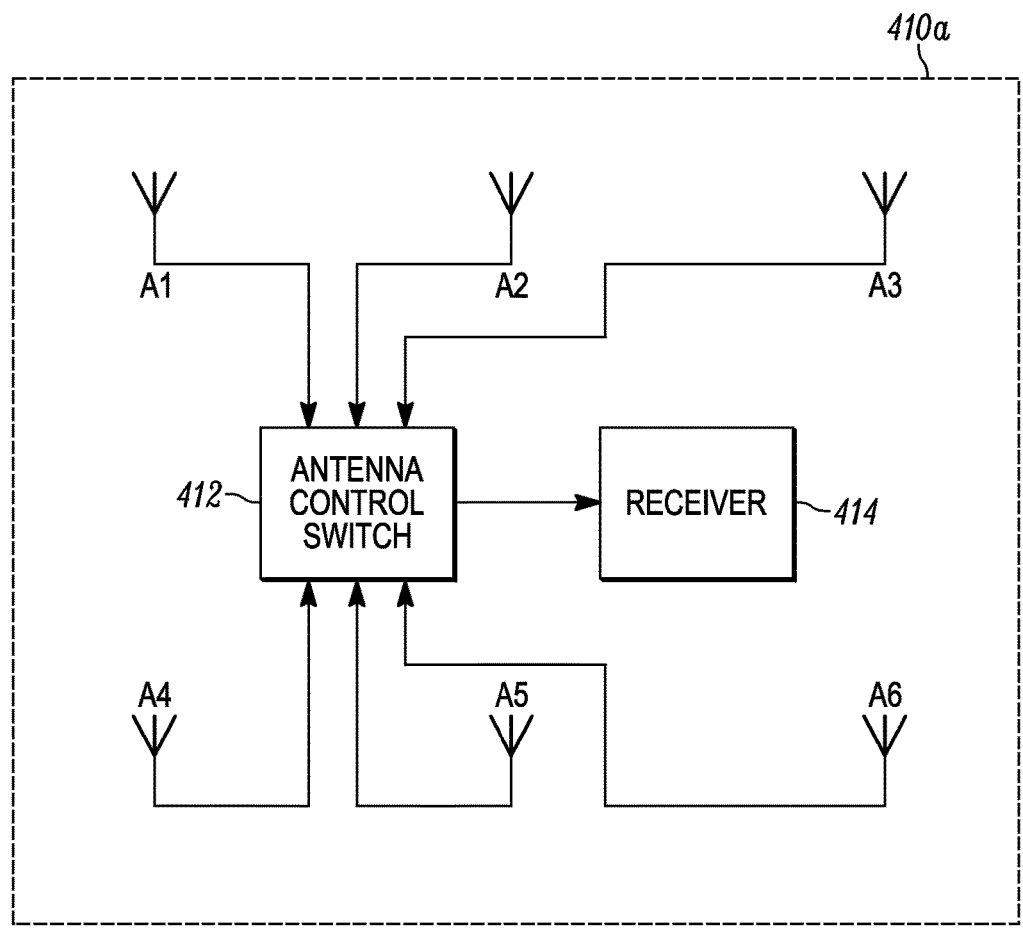
FIG. 8 is a circuit that includes a common receiver and an antenna switch for using in the radio locating device in accordance with some embodiments.
Figure 8:
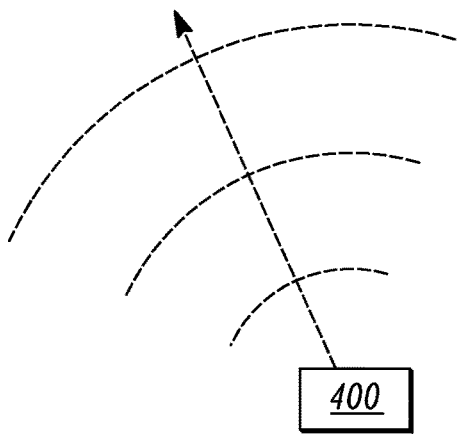

FIG. 5 depicts an embodiment of a radio locating system that includes a radio locating device configured to determine the physical location of an active device. In one implementation, the radio locating device 410a is located at a predetermined distance H from the floor level, and the distance h measured from the active device 400 to the floor level is known or can be separately determined. In some implementations, the radio locating device 410a includes an array of antennas, such as, the array of antennas 420 as shown in FIG. 7A or FIG. 7B. In the implementation as shown in FIG. 7A and FIG. 7B, the array of antennas 420 can include antennas A1, A2, A3, A4, A5, and A6 arranged in the form of a two-dimensional matrix (e.g., a 2×3 matrix as shown in the figure). The antennas A1, A2, A3, A4, A5, and A6 can have structures based on meandered dipoles as shown in FIG. 7A, structures based on PIFA (Planar Inverted F Antenna) as shown in FIG. 7B, or other type of structures known to people skilled in the art. FIG. 8 shows that RF signals emitted by the active device 400 are received by the radio locating device 410a. In some implementations, as shown in FIG. 8, the RF signals received by the antennas A1, A2, A3, A4, A5, and A6 can be coupled to a common receiver 414 through an antenna switch 412 in the radio locating device 410a.

In one implementation, as shown in FIG. 5, the radio locating device 410a can be configured to measure the elevation angle θ and the azimuth angle φ of the active device 400. After the RF signals from the active device 400 are detected with the array of antennas 420 on the radio locating device 410a, the elevation angle θ and the azimuth angle φ of the active device 400 can be determined. These angles can be determined with array signal processing techniques, such as, Bartlett Beamformer, MUSIC Beamformer, Capon Beamformer, or other techniques known to people skilled in the art. Once the elevation angle θ and the azimuth angle φ are determined, the x and y coordinates of the active device 400 can be determined with the following equations:

$$\begin{cases} x = (H - h)\tan\theta\cos\phi \\ y = (H - h)\tan\theta\sin\phi. \end{cases}$$

Figure 6:
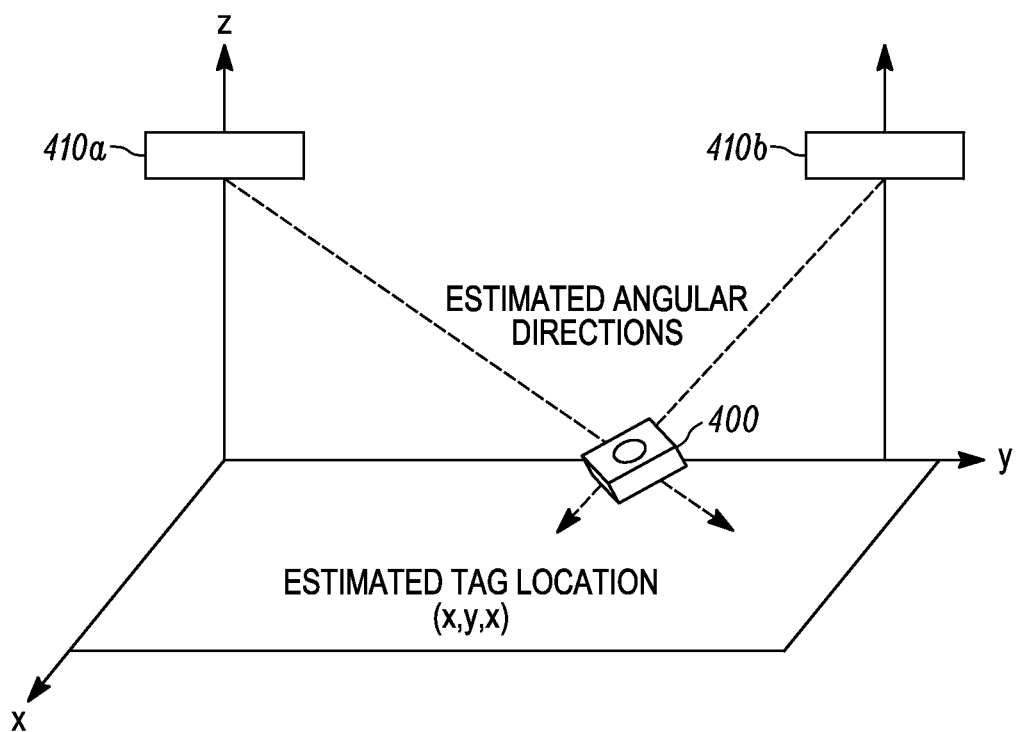
FIG. 6 depicts an embodiment of a radio locating system that includes two radio locating devices configured to determine the physical location of an active device.

FIG. 6 depicts an embodiment of a radio locating system that includes two radio locating devices configured to determine the physical location of an active device. In FIG. 6, the radio locating devices 410a and 410b of the radio locating system are distributed at different physical locations that are known or can be determined by some known techniques. In some implementations, each of the radio locating devices 410a and 410b can include an array of antennas, such as, the array of antennas 420 as shown in FIG. 7A or FIG. 7B. In some implementations, each of the radio locating devices 410a and 410b is configured to measure a corresponding Estimated Angular Direction of the active device 400 based upon the RF signals received from the active device 400. For each of the radio locating devices 410a and 410b, its corresponding Estimated Angular Direction can be determined with any array signal processing techniques known to people skilled in the art. Once the Estimated Angular Direction of the active device 400 for the radio locating devices 410a and 410b are both determined, the physical location of the active device 400 (e.g., the x, y, and z coordinates) can be determined with geometric analysis.

In FIG. 5 and FIG. 6, the measurement of the physical location of the active device 400 involves the measurement of the angle of arrival of a radio signal. In other implementations, the measurement of the physical location of the active device 400 can involve the measurement of the angle of departure of a radio signal. In still other implementations, the measurement of the physical location of the active device 400 can also involve the measurement of the time of flight of a radio signal.

Given that the physical location of the active device 400 is determined with a radio locating system, the accuracy of the measurement on the physical location of the RFID tags in the warehouse arrangement of FIG. 4 can be improved when RF signals from a beacon RFID tag near the active device 400.

Figure 9:
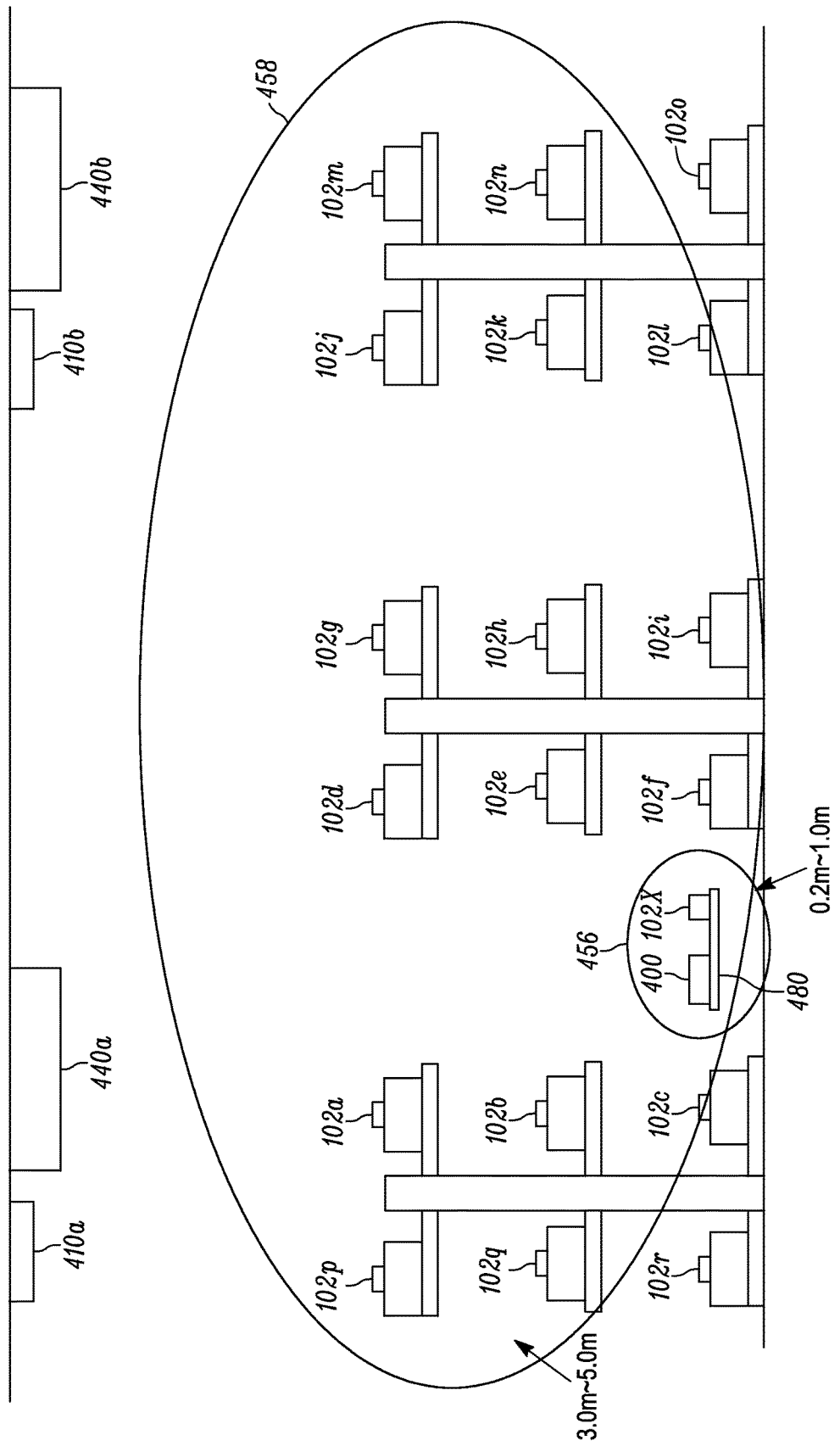
FIG. 9 is a schematic of a warehouse arrangement that has a radio locating system configured to determine the location of an active device and has a RFID reading system configured to read a beacon RFID tag located near the active device in accordance with some embodiments.

FIG. 9 is a schematic of a warehouse arrangement that has a radio locating system configured to determine the location of an active device and has a RFID reading system configured to read a beacon RFID tag located near the active device in accordance with some embodiments. In FIG. 9, a radio locating system is configured to measure the position of an active device 400 to an accuracy of better than 1.0 meter to determine the position of a reference point. In some implementations, as shown in FIG. 9, the radio locating system includes at least two radio locating devices 410a and 410b for measuring the position of the active device 400. In some other implementations, the radio locating system can use only one radio locating device (e.g., 410a) for measuring the position of the active device 400. In many implementations, the measured position of the active device 400 can be used as an estimate of the reference point.

In FIG. 9, an RFID reading system including one or more RFID readers (e.g., 440a or 440b) is installed in the warehouse for reading both a reference RFID tag 102X and at least one RFID tag of interest (e.g., 102a, 102b, 102c, . . . , 102q, or 102r) that is associated with a target object. The reference RFID tag 102X is located essentially at the same position of the reference point, which is near the measured position of the active device 400. The reference RFID tag 102X can be located on the active device 400 or in the active device 400; it can also be located on the same board 480 that supports the active device 400. In most implementations, the distance between the reference RFID tag 102X and the reference point is less than 0.2 meter. In practice, the distance between the reference RFID tag and the reference point can be less than 0.1 meter, less than 0.05 meter, or less than 0.01 meter. The RFID reading system includes a RF receiver configured to detect a first RF signal from the reference RFID tag 102X and a second RF signal from a RFID tag of interest (e.g., 102b). The RFID reading system also includes a controller configured to process both the first RF signal and the second RF signal and relying upon at least partially the position of the reference point to determine the position of the RFID tag of interest.

In some implementations, the controller can be configured to process a time difference between the time stamp of the first RF signal and the time stamp of the second RF signal. In some implementations, the controller can be configured to process a RSSI difference between the received signal strength indicator (RSSI) of the first RF signal and the RSSI of the second RF signal. In some implementations, the controller can be configured to process a phase difference between the phase of the first RF signal and the phase of the second RF signal. In some implementations, the controller can be configured to process a combination of two or more parameter-differences that includes the time difference, the RSSI difference, and the phase difference. In some implementations, the first RF signal from the reference RFID tag 102X and the second RF signal from the RFID tag of interest (e.g., 102b) are both generated in response to an interrogation RF signal from by the RFID reading system.

Figure 10:
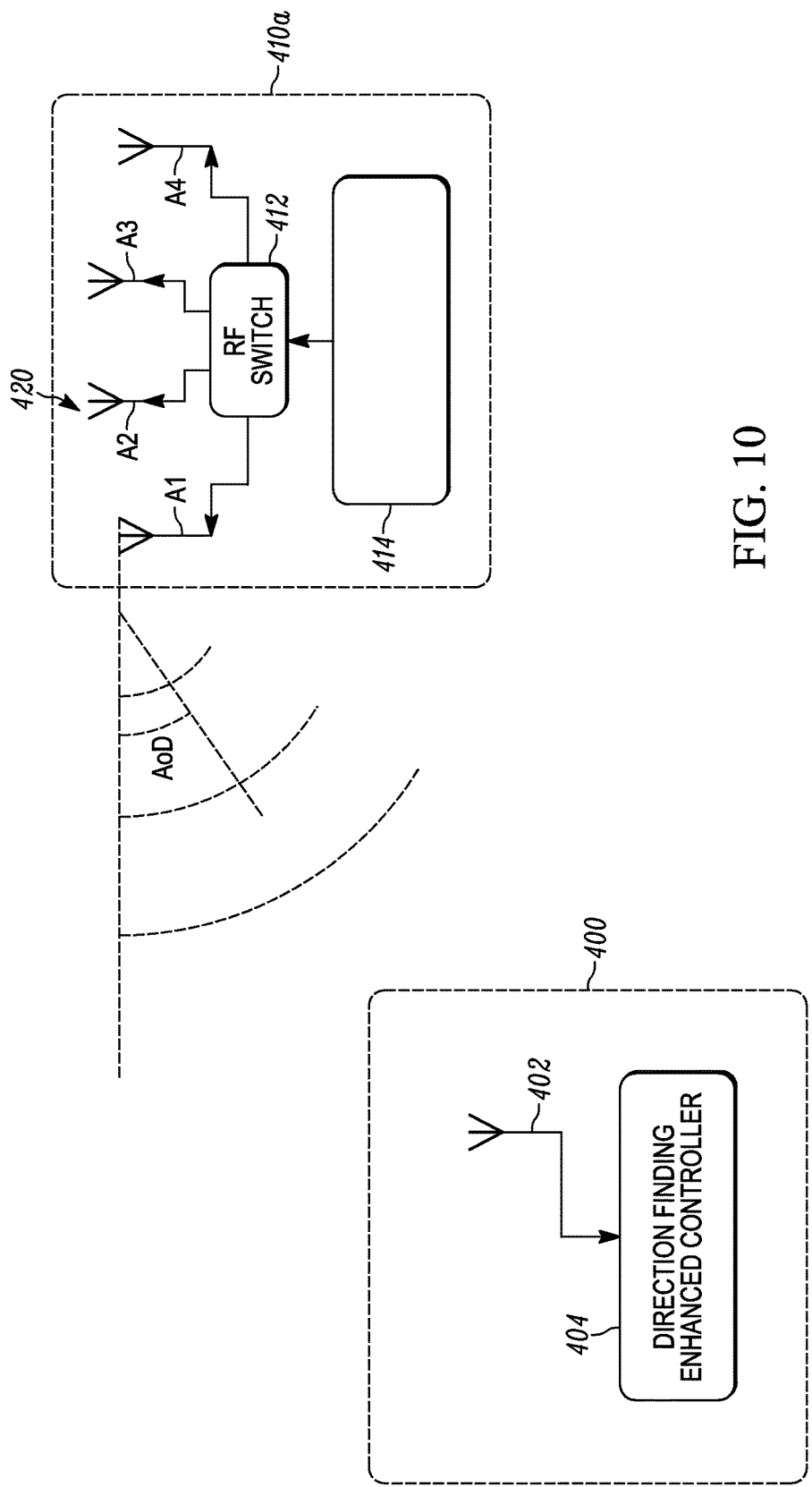
FIG. 10 depicts an arrangement in which the physical location of the active device is measured with time of departure in accordance with some embodiments.

In some implementations, to determine the position of the RFID tag of interest (e.g., 102b), an offset between the position of the RFID tag of interest (e.g., 102b) and the position of the reference point can be determined based upon at least the processing of both the first RF signal and the second RF signal. In one example, as shown in FIG. 10, the reference RFID tag 102X is located at a reference point P, and the position of the reference point P is estimated by measuring the position of the active device 400 to an accuracy of better than 1.0 meter with a radio locating system. The distance between a first RFID reader 410a and the reference point P is $R_a$, and the distance between the first RFID reader 410a and RFID tag 102b is $r_a$. The distance offset $\Delta r_a$ between the position of the RFID tag of interest (e.g., 102b) and the position of the reference point P is $\Delta r_a = R_a - r_a$. This distance offset $\Delta r_a$ can be determined based upon the processing of the time difference, the RSSI difference, or the phase difference between the RF signal from the reference RFID tag 102X and the RF signal from the RFID tag of interest (e.g., 102b). This measurement of the distance offset $\Delta r_a$ places a limit on the position of the RFID tag 102b that can be located.

In some implementations, in response to an interrogation RF signal from by the RFID reading system, the RFID tag of interest (e.g., 102b) generates both the second RF signal and a triggering RF signal for triggering beacon activity on the active device 400. The beacon activity can include causing the radio locating system to determine the current position of the active device 400. Such current position of the active device 400 can be used as the position of the reference point P to assist the determination of the physical location of the RFID tag of interest (e.g., 102b). Additionally, in some implementations, the triggering RF signal for triggering beacon activity on the active device 400 can be implemented to place a limitation on the distance between the active device 400 and the RFID tag of interest that generates the triggering RF signal. In one example, as shown in FIG. 9, only the triggering RF signal from RFID tags 102b, 102c, 102e, or 102f can trigger beacon activity on the active device 400. Such limitation on a tag's triggering distance also places a limit on the position of the RFID tag of interest that can be located.

In many implementations, the reference RFID tag 102X and the RFID tag of interest (e.g., 102b) have substantially identical antenna design. In many implementations, the reference RFID tag 102X and the RFID tag of interest (e.g., 102b) have substantially identical backscattering characteristics at the RF frequency of an interrogating signal from the RFID reading system. In many implementations, both the reference RFID tag 102X and the RFID tag of interest (e.g., 102b) are passive RFID devices.

In some implementations, the active device 400 is a battery powered device. The active device 400 can be a mobile computing device, such as, a smart phone, a tablet computer, a smart badge, or a smart watch. In some implementations, the active device 400 is configured to establish wireless connections with the radio locating system based upon a communication standard, such as, BLUETOOTH™ or ZIGBEE™. For example, when the active device 400 in FIG. 8 is a BLUETOOTH™ LE (Low Energy) device, the radio locating device 410*a* can be configured to establish a communication link with the active device 400 and receive BLUETOOTH™ communication packets from the BLUETOOTH™ LE 400. While the physical location of the active device 400 in FIG. 8 is measured with time of arrival, the physical location of the active device 400 can also be measured with time of departure, as depicted in FIG. 10.

The radio locating device 410*a* in FIG. 10 includes a direction finding enhanced controller 414, an RF switch 412, and an antenna array 420 (e.g., A1, A2, A3, A4, . . . ). The BLUETOOTH™ LE 400 includes an antenna 402 and a direction finding enhanced controller 404. After the radio locating device 410*a* establishes a BLUETOOTH™ communication link with the BLUETOOTH™ LE 400, the radio locating device 410*a* transmits Angle of Departure (AoD) enhanced packets to the BLUETOOTH™ LE 400. The packet contains the AoD field in a known section during which the radio locating device 410*a* executes antenna switching. The BLUETOOTH™ LE 400 receives AoD enhanced packets, and executes the in-phase and quadrature (I&Q) samples captured during the reception of the AoD field. Host processor in the BLUETOOTH™ LE 400 uses the captured I&Q samples and the information about the antenna array 420 to calculate the AoD of the packets transmitted by the radio locating device 410*a*. The AoD of the packets can be determined with array signal processing techniques, such as, Bartlett Beamformer, MUSIC Beamformer, Capon Beamformer, or other techniques known to people skilled in the art.

In some implementations, the active device 400 is configured to transmit to the radio locating system one or more digital communication packet containing the Electronic Product Code (EPC) of the reference RFID tag. In some implementations, the active device 400 has a media access control address (MAC address) for establishing digital communication with the radio locating system. The reference RFID tag 102X can be configured to transmit to the RFID reading system the MAC address of the active device 400.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for using a radio frequency identification (RFID) reading system to communicate with a reference RFID tag via a RFID communication protocol, the method comprising:
   using a radio locating system to wirelessly communicate with an active device via a second protocol that is different than the RFID communication protocol used by the RFID reading system to communicate with the reference RFID tag, including measuring the position of the active device to an accuracy of better than 1.0 meter using the radio locating system to determine the position of a reference point, wherein the active device is a mobile device and the reference point is a mobile reference point;
   using the RFID reading system to communicate with the reference RFID tag and a RFID tag of interest via the RFID communication protocol, including:
      (i) detecting a first RF signal from the reference RFID tag with an RF receiver in the RFID reading system, the radio locating system being a type of system that is different from the RFID reading system, wherein the reference RFID tag is located essentially at the same position of the mobile reference point, with the distance between the reference RFID tag and the reference point being less than 0.2 meter, and wherein the distance between the reference RFID tag and the RF receiver in the RFID reading system is more than 3.0 meter; and
      (ii) detecting a second RF signal from the RFID tag of interest with the RF receiver in the RFID reading system; and
   processing both the first RF signal and the second RF signal and relying upon at least partially the position of the reference point to determine a position of the RFID tag of interest.

2. The method of claim 1, wherein the radio locating system comprises:
   a plurality of radio locating devices distributed at multiple locations.

3. The method of claim 1, wherein said processing comprises at least one of:
   processing the difference between the time stamp of the first RF signal and the time stamp of the second RF signal;
   processing the difference between the received signal strength indicator (RSSI) of the first RF signal and the RSSI of the second RF signal; and
   processing the difference between the phase of the first RF signal and the phase of the second RF signal.

4. The method of claim 1, wherein said processing comprises:
   processing both the first RF signal and the second RF signal to determine an offset between the position of the RFID tag of interest and the position of the reference point.

5. The method of claim 1, wherein said measuring the position of the active device comprises at least one of:
   measuring the angle of arrival of a radio signal; and
   measuring the angle of departure of a radio signal.

6. The method of claim 1, wherein said measuring the position of the active device comprises:
   measuring the time of flight of a radio signal.

7. The method of claim 1, wherein the reference RFID tag and the RFID tag of interest have substantially identical antenna design.

8. The method of claim 1, wherein the reference RFID tag and the RFID tag of interest have substantially identical backscattering characteristics at the RF frequency of an interrogating signal from the RFID reading system.

9. The method of claim 1, wherein both the reference RFID tag and the RFID tag of interest are passive RFID devices.

10. The method of claim 1, wherein the active device is a mobile computing device including one of a smartphone, a tablet computer, a smart badge, and a smart watch.

11. The method of claim 1, wherein the active device is configured to establish wireless connections with the radio locating system based upon a standard including one of BLUETOOTH™ and ZIGBEE™.

12. The method of claim 1, further comprising:
   transmitting from the active device to the radio locating system one or more digital communication packet containing the Electronic Product Code (EPC) of the reference RFID tag.

13. The method of claim 1, wherein the active device has a media access control address (MAC address) for establishing digital communication with the radio locating system.

14. The method of claim 13, further comprising:
   transmitting from the reference RFID tag to the RFID reading system the MAC address of the active device.

15. The method of claim 1, further comprising:
   triggering beacon activity on the active device with a radio signal from one of the RFID tags including the reference RFID tag and the RFID tag of interest.

16. The method of claim 15, further comprising:
   generating said radio signal from said one of the RFID tags in response to said one of the RFID tags being interrogated by the RFID reading system.

17. The method of claim 1, wherein the distance between the reference RFID tag and the reference point is less than 0.1 meter.

18. The method of claim 1, wherein the distance between the reference RFID tag and the reference point is less than 0.05 meter.

19. The method of claim 1, wherein the distance between the reference RFID tag and the reference point is less than 0.01 meter.

20. An apparatus for using with radio frequency identification (RFID) tags, the apparatus comprising:
   an RFID reading system configured to communicate with a reference RFID tag and a RFID tag of interest via a RFID communication protocol;
   a radio locating system configured to wirelessly communicate with an active device via a second protocol that is different than the RFID communication protocol used by the RFID reading system to communicate with the reference RFID tag and the RFID tag of interest, wherein the radio locating system is configured to measure the position of the active device to an accuracy of better than 1.0 meter to determine the position of a reference point, wherein the active device is a mobile device and the reference point is a mobile reference point;
   the RFID reading system having a RF receiver configured to:
      (i) detect a first RF signal from the reference RFID tag, wherein: (a) the reference RFID tag is more than 3.0 meter away from said RF receiver, (b) the radio locating system is a type of system that is different from the RFID reading system, (c) the reference RFID tag is located essentially at the same position of the mobile reference point, and (d) the distance between the reference RFID tag and the reference point is less than 0.2 meter; and (ii) detect a second RF signal from the RFID tag of interest; and a controller configured to process both the first RF signal and the second RF signal and to rely upon at least partially the position of the reference point to determine the position of the RFID tag of interest.

21. The apparatus of claim 20, wherein the radio locating system comprises:

a plurality of radio locating devices distributed at multiple locations.

22. The apparatus of claim 20, wherein the controller is configured to process at least one of:

the difference between the time stamp of the first RF signal and the time stamp of the second RF signal;

the difference between the received signal strength indicator (RSSI) of the first RF signal and the RSSI of the second RF signal; and the difference between the phase of the first RF signal and the phase of the second RF signal.

23. The apparatus of claim 20, wherein the controller is configured to process both the first RF signal and the second RF signal to determine an offset between the position of the RFID tag of interest and the position of the reference point.

24. The apparatus of claim 20, wherein the radio locating system is configured to measure the angle of arrival of a radio signal to measure the position of the active device.

25. The apparatus of claim 20, wherein the radio locating system is configured to measure the angle of departure of a radio signal to measure the position of the active device.

26. The apparatus of claim 20, wherein the radio locating system is configured to measure the time of flight of a radio signal to measure the position of the active device.

27. The apparatus of claim 20, wherein the reference RFID tag and the RFID tag of interest have substantially identical antenna design.

28. The apparatus of claim 20, wherein the reference RFID tag and the RFID tag of interest have substantially identical backscattering characteristics at the RF frequency of an interrogating signal from the RFID reading system.

29. The apparatus of claim 20, wherein both the reference RFID tag and the RFID tag of interest are passive RFID devices.

30. The apparatus of claim 20, wherein the active device has a battery therein.

31. The apparatus of claim 20, wherein the active device is a mobile computing device including one of a smartphone, a tablet computer, and a smart watch.

32. The apparatus of claim 20, wherein the active device is configured to establish wireless connections with the radio locating system based upon a standard including one of BLUETOOTH™ and ZIGBEE™.

33. The apparatus of claim 20, wherein the active device is configured to transmit to the radio locating system one or more digital communication packet containing the Electronic Product Code (EPC) of the reference RFID tag.

34. The apparatus of claim 20, wherein the active device has a media access control address (MAC address) for establishing digital communication with the radio locating system.

35. The apparatus of claim 34, wherein the reference RFID tag is configured to transmit to the RFID reading system the MAC address of the active device.

36. The apparatus of claim 20, wherein the active device is configured to start beacon activity upon triggering by a radio signal from one of the RFID tags including the reference RFID tag and the RFID tag of interest.

* * * * *